United States Patent [19]

Sonnie

[11] 3,736,634
[45] June 5, 1973

[54] ROTARY CUTTING TOOL
[75] Inventor: John R. Sonnie, Eastlake, Ohio
[73] Assignee: HiCarb Corporation, Cleveland, Ohio
[22] Filed: Mar. 17, 1971
[21] Appl. No.: 125,166

[52] U.S. Cl. ............................................. 29/103 A
[51] Int. Cl. ............................................. B26d 11/12
[58] Field of Search ........................... 29/103 A, 103

[56] References Cited

UNITED STATES PATENTS

| | | | |
|---|---|---|---|
| 3,058,199 | 10/1962 | Cave et al. | 29/103 A |
| 3,548,476 | 12/1970 | Cave et al. | 29/103 A |
| 3,117,366 | 1/1964 | Castor, Sr. | 29/103 A |
| 2,437,669 | 3/1948 | Adams | 29/103 A X |
| 2,278,738 | 4/1942 | Praeg | 29/103 |
| 1,407,837 | 2/1922 | Buckingham | 29/103 |

FOREIGN PATENTS OR APPLICATIONS

| | | | |
|---|---|---|---|
| 1,299,044 | 6/1962 | France | 29/103 A |
| 672,117 | 4/1952 | Great Britain | 29/103 |

Primary Examiner—Harrison L. Hinson
Attorney—Meyer, Tilberry & Body

[57] ABSTRACT

An end mill is provided which comprises a cylindrical body of solid carbide material having a plurality of parallel helical flutes in the outer surface thereof. Each of the flutes is provided with a plurality of notches having root lines perpendicular to the axis of the tool body, and the root line of each notch on one of the flutes is axially offset from the root line of a notch on the preceding flute a distance such that the offset notches axially overlap one another. The offset between notches of adjacent flutes is in the same direction as the hand of the helical flutes and preferably is approximately 0.015 inch. Further, the notches are defined by walls which are inclined approximately 40° relative to the axis of the tool. The tool structure provides for extremely small chips to be removed from a workpiece against which the tool is moved, whereby the tool can be operated at an extremely high spindle speed and with an extremely high linear tool feed rate to achieve heavy metal removal from a workpiece without chipping or breakage of the tool.

3 Claims, 3 Drawing Figures

ROTARY CUTTING TOOL

The present invention relates to rotary cutting tools and, more particularly, to rotary end mills.

End mills have been provided heretofore comprised of a body of high-speed steel having a plurality of parallel helical flutes in the outer surface thereof. Further, certain end mills of this character have been provided with notches or teeth in the flutes, which teeth have taken various configurations relative to the longitudinal axis of the tool. For example, teeth have been provided which are defined by a continuous serpentine line extending along the length of a flute. These teeth generally extend circumferentially of the body of the tool in a pattern which is defined by a truly helical path extending either in the same or opposite direction of hand from the hand of the helical flutes of the tool. All of the tools of this character heretofore known are intended to cut small chips from a workpiece upon rotary engagement of the tool therewith. Moreover, these tools allegedly are operable at a higher rotary speed than high-speed steel end mills wherein the flutes are not provided with teeth. End mills of this character heretofore known have enjoyed very limited success with respect to the cutting of metal workpieces ranging in hardness up to the hardness of high speed steel.

End mills have also been provided in the past which are comprised of a body of solid carbide material having helical flutes in the outer surface thereof. Carbide end mills of this character are employed in side and end milling operations on materials including metals having a hardness exceeding that of high-speed steel. These tools, however, are limited in the rotational or spindle speed at which they may be run and the rate at which they may be fed relative to a workpiece. In this respect, the cutting edges on the flutes are elongated continuous cutting edges which, during operation of the tool, continuously move in cutting engagement with the workpiece to sever a substantially wide curl or shaving of metal from the workpiece. If the tool is operated at too high a rotary speed, extreme heating of the tool is realized because of the continuous engagement between the tool and workpiece and because the size of the curl of metal removed is too large to effectively transfer the heat from the tool. Accordingly, extremely high tool wear is realized in response to high speed operation of such end mills. Further, the length of the cutting surface of the tool which engages the workpiece is so large that the bight of the tool into the workpiece is limited to an extremely thin bight or cut per revolution of a given flute. If too large a bight is attempted, the pressure exerted between the workpiece and the advancing tool will cause breakage of the tool due to the brittleness of the solid carbide material. Moreover, the pressure exerted increases the temperature of the cutting edge of the tool, whereby the life of the tool is further shortened.

Rotary cutting tools of solid carbide for deburring and similar light metal removal operations have also been provided heretofore. These tools include eight or more helical flutes of one hand in the outer surface thereof which are intersected by a helical groove of the opposite hand provided in the tool surface. The flutes are quite shallow because of the large number thereof and the helical groove in these tools is of such a wide pitch that the teeth defined in the flute by the groove are extremely wide. Accordingly, such tools are limited to very light stock removal from a workpiece and, because of the high temperature and brittleness problems pointed out above with regard to standard carbide end mills, are not capable of taking a heavy cut of metal from a workpiece or operating at high spindle speeds or feed rates. Tools of this character are generally employed for deburring workpieces, and removing excess welding material from a joint between two workpieces.

Attempts to operate any of the above mentioned tools at too high a rotational speed and too great a feed rate relative to a given workpiece results in burning or dulling of the cutting edges of the tool, breakage of the tool, or chipping of the flute edge. Each of these limitations reduces the effectiveness of the tool as well as the life thereof. Moreover, attempts to use high-speed steel tools having teeth of the character described above to cut metals having a hardness equal to or greater than that of high-speed steel cannot be achieved with any degree of success, even when the rotational speed of the tool and the feed rate are reduced to a minimum to protect the tool. Such tools simply will not operate to remove an adequate amount of metal from the workpiece at a reasonable feed rate and for a reasonable length of time.

It will be appreciated that the limitations of the tools heretofore known, namely shorter tool life, slower rotary or spindle speed and slower tool feed rate, directly effect production costs of machining projects in which such tools are employed.

Accordingly, it is an outstanding object of the present invention to provide a rotary milling tool operable to remove more material from a given workpiece in a shorter period of time and with less wear on the tool than any rotary milling tool heretofore known.

Another object of the present invention is the provision of a rotary milling tool of the above character adapted to be operated at a higher spindle speed than milling tools heretofore known.

A further object of the present invention is the provision of a rotary milling tool adapted to be operated at a greater feed rate to a given workpiece than milling tools heretofore known.

Another object of the present invention is the provision of a rotary milling tool having structural characteristics which permits its operation at a high rate of rotational speed and at a high feed rate relative to a workpiece, whereby considerably more metal is removed from the workpiece in a given length of time than heretofore possible.

Yet another object of the present invention is the provision of a rotary cutting tool of the above character which has a longer tool life when operating at high rotational speeds and feed rates than do tools heretofore known when operating at lower rotational speeds and feed rates in performing similar metal removal operations.

Still a further object of the present invention is the provision of a rotary cutting tool of the above character produced from solid carbide material and having flutes provided with notches having structural characteristics which lend to the removal of extremely small chips from a workpiece, which chips are so small that the heat of cutting is readily transferred to the chips thus to reduce heat transfer to the tool, whereby less wear of the tool is realized during use thereof.

The foregoing and other objects are achieved in accordance with the present invention by providing a rotary milling tool of solid carbide material having from two to six helical flutes in the outer surface thereof. The nominal size of the tool diameter, the depth of the flutes and clearances provided on the top or cutting edges of the flutes correspond to standard dimensions for end mills, which dimensions are well known to those skilled in the art and are published in a schedule of dimensions for such tools which is readily available in the tool and machine industry. One carbide material from which the tool may be made is C2 carbide. Again, the latter carbide material is used quite extensively in the tool industry in making solid carbide end mills and other carbide rotary cutting tools. Other carbide materials, however, could be used.

The flutes of the carbide tool are provided with precision ground notches having flat, planar side walls and a root line which extends perpendicular to the axis of the tool, and perpendicular to a radial line extending through the flute adjacent the under cut of the flute. The notches in a given one of the flutes of the tool are each axially offset relative to a notch on the preceding flute of the tool. Adjacent walls of adjacent notches on a given flute intercept the top or cutting edge of the flute and the area of the flute therebetween defines a cutting tooth. The tooth has a cutting surface at the top edge of the flute which is defined by the distance between the adjacent walls of the adjacent notches. The opposite walls of each of the notches are inclined relative to the axis of the tool at an angle which is carefully controlled within a desired range. Further, the axial offset between the notches on one flute and the notches on the preceding flute is carefully maintained within a range of dimensions so that portions of the offset notches are in overlapping relationship with one another circumferentially of the tool. The notch wall angle and the axial offset dimension are both maintained within the ranges therefore, regardless of the nominal diameter of the tool. As the nominal tool diameter increases, however, it is preferable to increase the depth of the notch so that the teeth are enlarged commensurate with the tool diameter and flute depth, whereby the larger diameter tool can achieve heavy stock removal from a workpiece with more efficiency then would be possible if the tool were provided with a smaller tooth size. With regard to heavy stock removal, it should be noted that applicant's tool is capable of from 0.015 to 0.020 inch chip removal from a workpiece per revolution of the tool.

Rotary milling tools made in accordance with the present invention can be used for material removal and cutting operations on materials including stainless steels, cast iron, fiberglass, reinforced plastics, non-ferrous metals, all non-metallic materials, and most importantly on exotic and refractory metals which are Rockwell 60C or harder. Moreover, the tool of the present invention can mill and cut these materials faster than any end mill tool heretofore known and has a tool life which, even when cutting the hardest of the refractory metals, is considerably longer than that of standard solid carbide end mills, modified forms of end mills, and other solid carbide rotary cutting tools heretofore known.

End mills made in accordance with applicant's invention will cut most materials at a cutting rate of approximately 200 surface feet per minute. The surface feet cutting rate is the actual length of cutting engagement of a given size tool with a workpiece for each revolution of the tool. The 200 surface feet per minute is used as a guide in determining the spindle speed for a given size tool and establishes a spindle speed at which the particular size tool is best operable to cut most materials. For example, a ½ inch nominal diameter tool has a circumference of approximately 0.13 feet. Thus, the spindle speed for this tool to operate efficiently in cutting most materials is (200 FT/MIN/0.13 FT/REV) or approximately 1538 RPM. Characteristics of the material to be cut and the size of the cut will dictate whether this particular spindle speed is suitable. In this respect, soft materials such as wood and plastic may be cut at a much higher spindle speed, while extremely hard materials in to 50 to 60 Rockwell hardness range may require a lower spindle speed. Thus, the 200 surface feet per minute rate is a guide for determining the spindle speed which is most often applicable and establishes a basis for determining the most efficient spindle speed for a given set of conditions. By using the 200 surface feet per minute, a basic spindle speed can readily be determined for any given nominal diameter size tool.

End mills made in accordance with the present invention have been tested in comparison with existing tools for performing a given cutting or milling operation. In each of the comparison tests, the tool of the present invention far out performed the tools which were being used at the time to achieve the cutting function. The performance of the tool of the present invention in this respect is clearly illustrated by the following examples.

EXAMPLE 1

Side milling of RC46-48 Hot work steel was being performed employing standard high-speed steel and carbide mills. The mills were employed at a spindle speed of 175 RPM to remove metal from the side of a workpiece to a lateral depth of ¼ inch and a vertical depth of 1¼ inch. After 6 to 8 linear inches of cutting, excessive tool wear resulted. Accordingly, frequent replacement of tools was required to complete the milling operation. A ½ inch, four flute solid carbide end mill made in accordance with the present invention was employed for performing the same cutting operation on the same workpiece material. The tool was operated at a spindle speed of 1500 RPM and at a feed rate of 7-½ inches per minute. After 50 linear inches of milling, tool wear was minimal.

EXAMPLE 2

An inside milling project involving re-working of a die block of RC36-38 steel required a 120 linear inch cut of the material. Under former practice, a ½ inch high-speed steel end mill was employed operating at a spindle speed of 175 RPM and a feed speed of 1-½ inches per minute and a cutting depth of 0.015 inch. Due to excessive tool wear, one such tool would not complete the required 120 inch linear cut. A ½ inch, four flute solid carbide end mill made in accordance with the present invention was employed in the same project. The tool was operated at a spindle speed of 900 RPM. and at a feed rate of 10 inches per minute. The tool of the present invention machined three complete die pieces, a total of 360 linear inches, without resharpening.

EXAMPLE 3

In a project involving T-slotting of modular cast iron, standard solid carbide end mills were formerly used to cut a slot 1.1 inch in depth. Two passes of the tool were necessary to accomplish the full depth, with the first cut being 0.875 inch deep. The tool was operated at a spindle speed of 900 RPM, and a feed rate of 6 inches per minute. Such use of the standard carbide end mill resulted in chip buildup, excessive heat and wearing of the tool, and occasional breakage of the end mill. A four flute, solid carbide end mill made in accordance with the present invention was employed to achieve the same slotting operation. The tool was set to cut the full depth of 1.1 inch, was operated at a spindle speed of 900 RPM and at a feed rate of 10-¾ inches per minute. As a result, the tool of the present invention completed the cut to the total depth in a single-pass and after 1196 inches of cutting only minimal wear of the tool was apparent.

EXAMPLE 4

A pilot project involved correcting an engineering error resulting in steel cams which were too heavy for use in machines which they were designed for. The steel cams had a Rockwell hardness of 60 and the excess metal to be removed therefrom measured 1 inch by 1-¼ inches by 5 inches. Elox metal removal was considered the only way to remove the excess metal and the cost thereof was $60.00 for each cam and was considered excessive. Removal of the excess metal by any end mill available at that time was considered impossible. The excess metal was, however, removed by employing an end mill made in accordance with the present invention. In this respect, a ¾ inch four flute solid carbide mill was employed and operated at a spindle speed of 1100 RPM. The tool was hand fed using multiple passes each of which was at a depth of 0.200 inch. The total machining time required to remove 1 inch by 1-¼ inches by 5 inches of metal from each cam was 25 minutes, and resulted in a reduction of cost of metal removal of $11.00 per cam. Moreover, tool wear was considered satisfactory for the work performed.

EXAMPLE 5

Beryllium plates of ⅝ inch thickness were to be side milled to remove ¼ inch of metal from the plate edges. A standard carbide end mill required 3 cuts of approximately 0.210 inch in depth at a feed rate of 4 inches per minute. This resulted in excessive work time, and excessive tool wear was encountered as a result of the multiple cut requirements. A three flute, ⅝ inch solid carbide mill made in accordance with the present invention was employed to achieve the metal removal from the Beryllium plates and was operated at a spindle speed of 1200 RPM and a feed rate of 15 inches per minute. The entire ¼ inch cut at full depth was made with one pass which is an increase of over 10 times in metal removal capacity. Further, an increase of 300 percent in tool life was realized. Moreover, the standard carbide end mill caused surface damage to the Beryllium plates to a depth of 0.010 inch. With applicant's tool, surface damage was reduced to 0.0015 inch.

The above examples of comparison tests are clearly illustrative of the fact that the end mill of the present invention is operable at a higher spindle speed than end mills heretofore known, is operable at a greater feed rate per minute than mills heretofore known and enjoys a longer tool life than the tools heretofore known. All of these factors lend to increased production rates together with lower production costs.

While the tools in the above examples which were compared with the tool of the present invention are identified as standard end mills having uninterrupted helical flutes, it should be noted at this point that a ½ inch, four flute tool of the present invention was further compared with a ½ inch, four flute end mill of high-speed steel wherein the flutes were serrated to define teeth which extended peripherally about the tool along a helical path opposite in hand to the hand of the flutes of the tool. The latter tool and the tool of the present invention were operated at the same spindle speed at the same feed rate while side milling a block of aluminum. A cut was made approximately ¼ inch wide and approximately 1 inch deep. After the cut had been extended under hand feed a distance of approximately 2 inches along the side of the block, the high-speed steel tool was very obviously worn and would not continue to cut efficiently. Moreover, the workpiece was marred toward the end of the cut and the tool was too hot to touch. After the same size cut employing the tool of the present invention there was absolutely no tool wear evident, the cut was smooth and the tool was cool enough to be held by hand. In a further test, the high-speed steel tool with serrated flutes was employed in an attempt to cut a cylindrical bar of high-speed steel of 54–56 Rockwell C hardness. The highspeed steel tool, even when very gradually fed by hand would not cut the high speed steel bar. A standard solid carbide end mill not made in accordance with applicant's invention was then employed in an effort to cut the high-speed steel bar and, while the carbide mill would cut the high-speed steel if advanced slowly relative thereto, the cutting edge of the flutes of the mill chipped excessively rendering the mill unacceptable for further use. This chipping was realized before the mill had penetrated the high-speed steel workpiece more than 1/16 inch. The same ½ inch four flute tool made in accordance with the present invention and employed in cutting the aluminum workpiece mentioned above readily cut the high-speed steel workpiece with no apparent wear of the tool resulting.

As a further example of the ability of applicant's tool to out perform mills and other cutters heretofore known, T-slots are often cut in steel plate by use of a planar machine. Such planar operations for a given T-slot size and length require 2 hours and 20 minutes to cut one slot. A milling tool made in accordance with the present invention achieves the same slot cutting in 27 minutes, more than 5 times as fast. In a project involving production of metal components of R48 hardness, milling of the components previously had to be done before the components were hardened. With a mill made in accordance with the present invention, the milling can be done after hardening, thus facilitating elimination of additional finishing operations previously required. Certain marble sculpturing operations have in the past been performed with standard carbide end mills. This often results in chipping of the marble and, consequently, in the loss of material or production of inferior products. With a mill constructed in accordance with the present invention, chipping of the marble is avoided which advantageously results not only in better product appearance but in reduced production costs. Yet another example is provided from a comparison of applicant's mill with a cobalt mill having a serrated cutting edge employed to cut slots in an exotic metal having a manufacturers designation Pratt and Whitney 1007. The cobalt serrated mill required four hours to cut a single slot of given dimensions in the metal. A mill made in accordance with applicant's invention cut four of the same size slots in the exotic metal in 25 minutes.

The objects and advantages of the present invention will in part be obvious and in part more fully pointed out hereinafter in conjunction with the description of the drawing representing a preferred embodiment of the present invention and in which.

Figure 1:
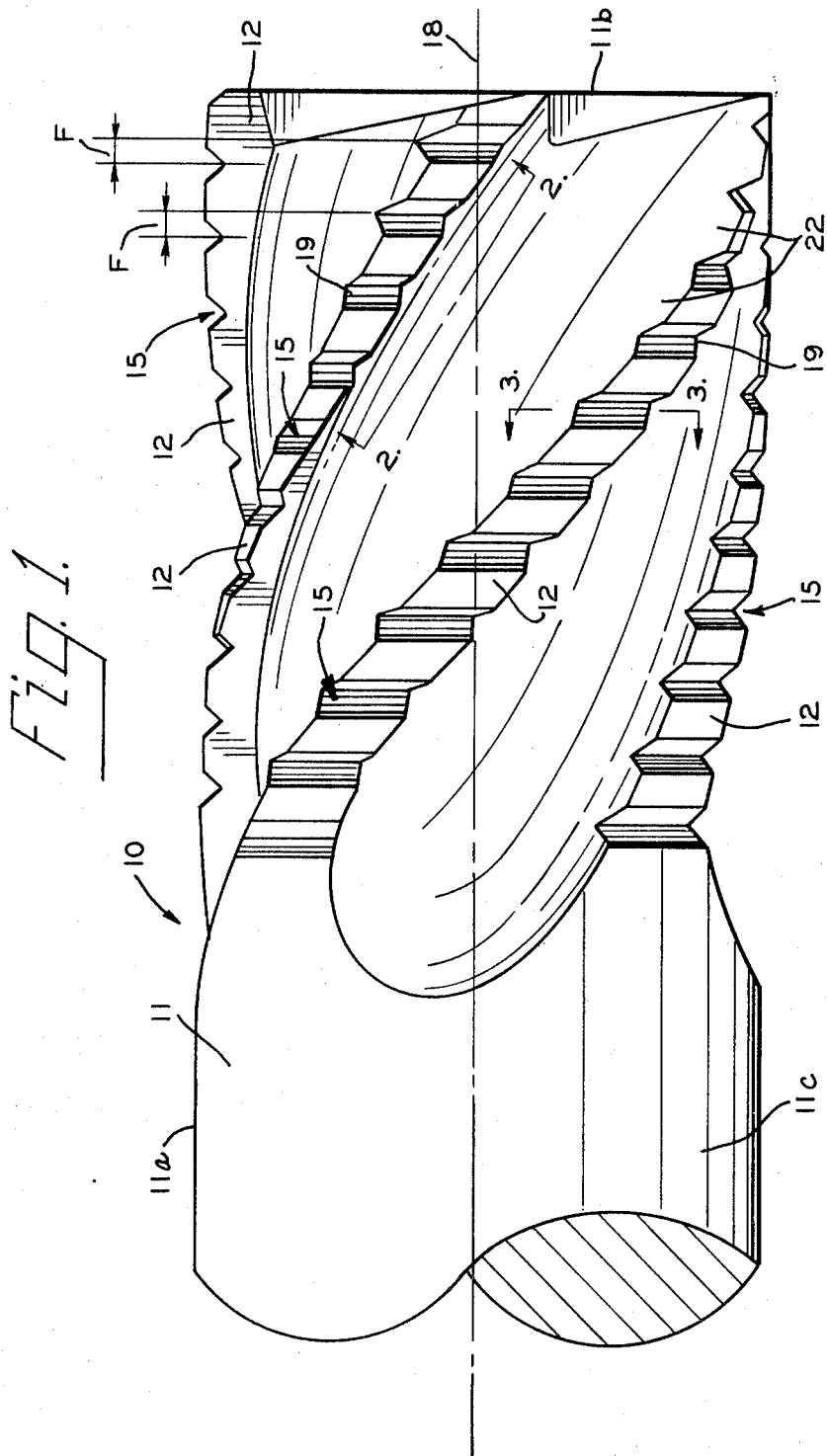
FIG. 1 is a plan view of a four flute end mill made in accordance with the present invention.

Referring now to the drawing in greater detail wherein the showings are for the purpose of illustrating a preferred embodiment of the invention only and not for the purpose of limiting the same, a four flute end mill 10 is illustrated which is comprised of a body portion 11 of solid carbide material having helical flutes 12 provided in the outer surface thereof. Each flute is provided along the length of the outer surface thereof with clearance portions 13 and 14, and each flute has a radial depth A which is measured from the outer surface 11a of the tool body and varies in accordance with the nominal diameter of the tool body. As thus far described, the tool conforms with standards for solid carbide end mills. In this respect, the flute depth and clearance dimensions are provided in accordance with standards therefor which are well established in the machine tool field. The carbide material from which the tool is made may, for example, be any one of the grades established by General Motors as automotive standards of solid carbide and designated as grades C1 through C13. Grades C1, C2 and C3 are cast iron cutting grades and grades C4 through C13 are steel cutting grades. Other manufacturers have established their own grade designations for solid carbide materials and, accordingly, it will be appreciated that solid carbide materials having grade designations other than the General Motors designations may be employed.

The flutes 12 are each provided with a plurality of notches 15 along the length thereof, all of which notches for a tool having a given nominal diameter are substantially the same in size and shape and are substantially equally spaced apart along the length of the corresponding flute. Each notch is precision ground to define a pair of sidewalls 16 and 17 each of which is inclined at an angle B to the axis 18 of the tool. Walls 16 and 17 merge at the bottom of each notch to define a root line 19 for the notch. The root line may be defined by a sharp juncture between walls 16 and 17 or may be defined by providing a slight radius at the bottom of the notch. The provision of at least a slight radius of the character mentioned is difficult to avoid in grinding the notches, but preferably a maximum root radius of approximately 0.015 inch is maintained. The root line is perpendicular to a radial line 20 extending outwardly through the flute adjacent the flute undercut 21.

Root line 19 defines the center line of each notch, and adjacent notches on each flute of the tool are spaced apart center line to center line a distance C. Further, each notch has a depth D measured from the outer surface 11a of the tool body. Depth D is the distance between root line 19 and a plane tangent to the tool body and parallel to root line 19. The area of the flute between adjacent notches thereof defines a tooth 22 which has a cutting edge disposed between the adjacent notches and which is of length E. The center line to center line distance C and the length of the cutting surface E are measured along the flute as opposed to being measured along the axis of the tool.

As mentioned hereinabove, each notch is precision ground by use of a diamond grinding wheel, or the like. The notches are ground transversely perpendicular to the axis of the tool, whereby the root line of each notch of the tool extends perpendicular to the tool axis. More particularly, the grinding of each notch is achieved by supporting opposite ends of the tool for the axis thereof to be parallel to the axis of the grinding wheel, positioning the flute to be notched so that flute line 20 is positioned radially relative to the tool and grinding wheel axes, and moving the grinding wheel and tool axes relative to one another while maintaining the parallel alignment relationships therebetween so that the notch is cut or ground for the root line thereof to extend perpendicular to the longitudinal axis of the tool. The notches are cut one at a time progressively about the circumference of the tool from one flute to the next succeeding flute, and in providing the notch in the next succeeding flute the latter is axially offset a distance F from the notch just ground in the preceding flute. The offset of a notch on one flute from a notch on the next preceding flute is measured axially of tool axis 18 and the offset is achieved by axially displacing either the tool or the grinding wheel between the grinding of successive notches. The offset is in the direction from outer end 11b of the tool body toward shank end 11c thereof. While the offset of the notches provides for the latter to advance progressively from outer end 11b toward shank end 11c of the tool, it is to be clearly noted that the root lines of the notches extend perpendicular to axis 18 of the tool, whereby the root lines do not define a truly helical path circumferentially of the tool.

The size of the teeth of the cutting tool defined by the area of the flute between adjacent notches thereon is varied in accordance with the nominal size of the tool so that the teeth are capable of a desirable heavy stock removal for the particular tool diameter. It is to be noted, however, that the axial offset between a notch on one flute and a notch on the preceding flute and the angle of the sidewalls of the notch relative to the tool axis are each maintained within corresponding predetermined ranges for all tool diameters. The depth of the notches is varied to maintain a small tooth size or length of cutting edge between adjacent notches on a flute so that a small chip is removed from a workpiece by a given tooth. The provision for removal of a small chip reduces pressure exerted against the tool and provides for transfer of heat to the chip to decrease tool heating, whereby the tool can be run at a faster spindle speed and a faster linear feed rate than is otherwise possible, thus to achieve heavy stock removal with a minimum of tool wear.

More particularly, with regard to the foregoing notch angle characteristic, for any given nominal diameter tool size the sidewalls of the notch are inclined at an angle of from 35° to 45° relative to the axis of the tool and, preferably, the walls are inclined at an angle of 40° relative to the tool axis. An angle less than 35° or greater than 45° results in inadequate dispersal of chips from the flutes, cutting of large chips or inability of the tool to be fed at a rate which produced heavy metal removal. All of these factors, singly or in combination, reduce production rates, heat the tool excessively whereby the life of the tool is shortened, and increase production costs.

Figure 2:
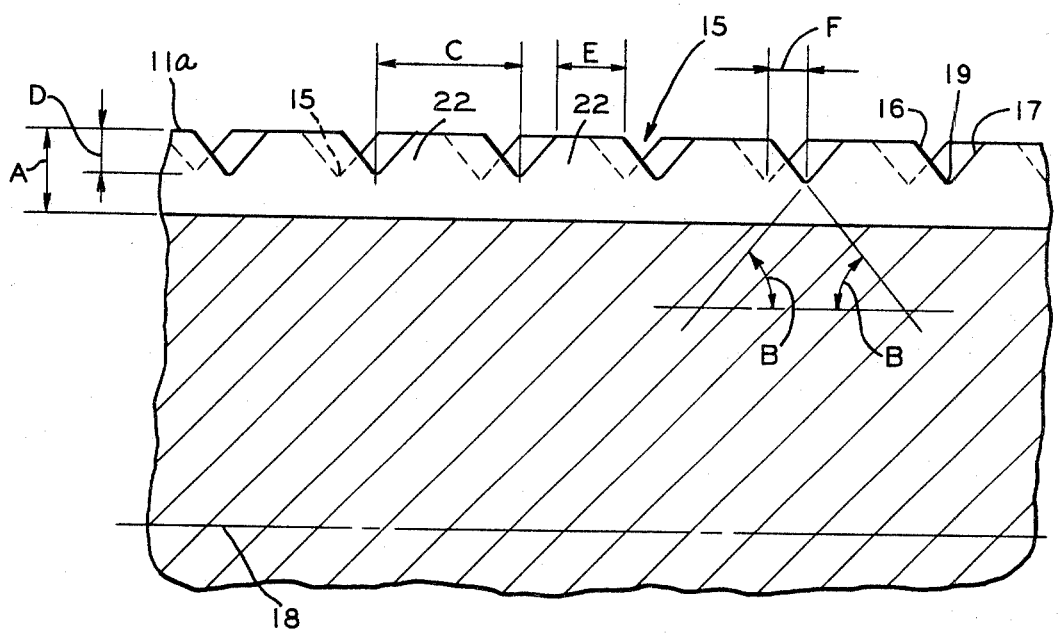
FIG. 2 is an elevational view of a flute of the tool taken along line 2—2 in FIG. 1 and illustrating the relationship between the notches on the next adjacent flute.

With regard to the notch offset mentioned above, the notches on one flute of the tool are each offset from a notch on the preceding flute of the tool a distance of from 0.010 to 0.020 inch measured axially of the tool and, preferably, the offset is 0.015 inch. An offset outside these limits results in the same disadvantages enumerated above with regard to the notch angle. Accordingly, the notch angle and offset characteristics are maintained for cutting tools of the present invention regardless of the nominal diameter thereof. Further, the relationship of notch wall angle and offset distance provides for notches on adjacent flutes to overlap one another, as illustrated in FIG. 2 of the drawing.

Figure 3:
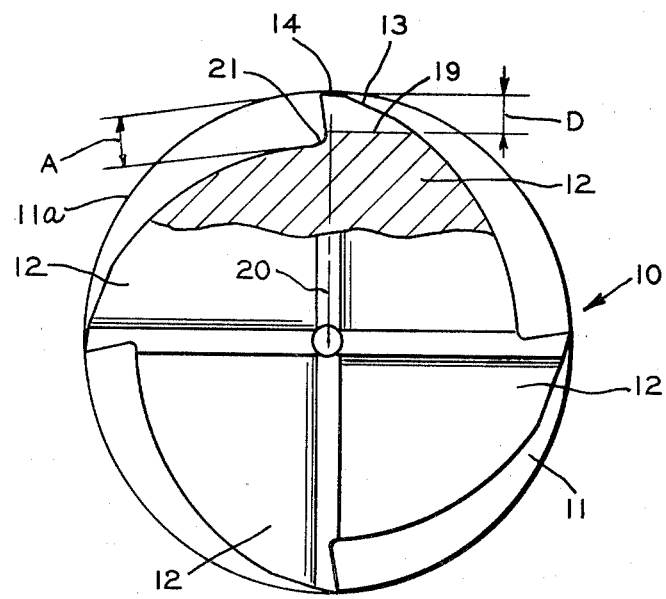
FIG. 3 is a sectional elevation view of a flute of the tool taken along line 3—3 in FIG. 1.

Application of the present invention with regard to nominal tool diameters of from ⅛ inch to 1 inch is illustrated by the following table in which the dimensions B, C, D, E, and F correspond to the notch angle and to dimensions discussed hereinabove with regard to FIGS. 1, 2 and 3 of the drawing. The table also identifies the number of notches per inch for each of the tools, the number of notches being measured along the length of the flute.

It will be noted that for each of the tool sizes in the above-identified table, the range of the notch angle and the notch offset is the same. Further, it will be noted that the length of the cutting surface between adjacent notches on a flute for the total range of tool sizes varies from 0.030 inch to 0.055 inch, that the notch depth varies from 0.010 inch to 0.045 inch, and that the center line to center line distance varies from 0.060 inch to 0.130 inch. It will be noted that these dimensions are the same for certain groups of tool sizes, but as mentioned hereinabove, these dimensions can vary for each tool within a group if desired. To do so would, of course, vary the number of notches per inch from one tool size to the next. The notch angle and offset ranges of 35° to 45° and 0.010 to 0.020 inch, respectively, are applicable to tools produced in accordance with the present invention which are of a larger diameter than the one inch nominal diameter set forth in the above table. In this respect, it will be appreciated that tools larger than the one inch diameter tool identified in the above table may readily be made and, accordingly, that the table is not intended to be a limitation but rather only illustrative of certain sizes of tools which may be made in accordance with the present invention.

As many possible embodiments of the present invention may be made, and as many possible changes may be made in the embodiments herein set forth, it is to be distinctly understood that the foregoing description is merely illustrative of the present invention and is not to be interpreted as a limitation thereof.

| Tool size nominal diameter inches | Notch wall angle (B) degrees | Notch centerline to centerline (C) in inches | Notch depth (D) in inches | Cutting surface between notches (E) in inches | Notch offset (F) in inches | Notches per inch |
|---|---|---|---|---|---|---|
| ⅛ | 35-45 | .060-.080 | .010-.030 | .025-.045 | .010-.020 | 20 |
| 5/32 | 35-45 | .060-.080 | .010-.030 | .025-.045 | .010-.020 | 20 |
| 3/16 | 35-45 | .060-.080 | .010-.030 | .025-.045 | .010-.020 | 20 |
| 7/32 | 35-45 | .060-.080 | .010-.030 | .025-.045 | .010-.020 | 20 |
| ¼ | 35-45 | .080-.090 | .015-.035 | .030-.050 | .010-.020 | 14 |
| 9/32 | 35-45 | .080-.090 | .015-.035 | .030-.050 | .010-.020 | 14 |
| 5/16 | 35-45 | .080-.090 | .015-.035 | .030-.050 | .010-.020 | 14 |
| ⅜ | 35-45 | .090-.110 | .020-.040 | .032-.052 | .010-.020 | 11 |
| 7/16 | 35-45 | .090-.110 | .020-.040 | .032-.052 | .010-.020 | 11 |
| ½ | 35-45 | .100-.120 | .020-.040 | .035-.055 | .010-.020 | 9 |
| 9/16 | 35-45 | .100-.120 | .020-.040 | .035-.055 | .010-.020 | 9 |
| ⅝ | 35-45 | .100-.120 | .020-.040 | .035-.055 | .010-.020 | 9 |
| 11/16 | 35-45 | .100-.120 | .020-.040 | .035-.055 | .010-.020 | 9 |
| ¾ | 35-45 | .100-.120 | .020-.040 | .035-.055 | .010-.020 | 9 |
| ⅞ | 35-45 | .110-.130 | .025-.045 | .040-.060 | .010-.020 | 8 |
| 15/16 | 35-45 | .110-.130 | .025-.045 | .040-.060 | .010-.020 | 8 |
| 1 | 35-45 | .110-.130 | .025-.045 | .040-.060 | .010-.020 | 8 |

The center line to center line distance between notches on a given flute, the depth of a notch from the outer surface of the tool and the length of the cutting surface between adjacent notches on a given flute vary as the above table illustrates. It will also be noted from the table that these dimensions may be the same for several tools of a group within the given range of nominal diameter sizes shown. Obviously, the latter three dimensional characteristics could be modified for each nominal diameter size of tool. To do so, however, involves considerable time and expense in the tool grinding operation. Moreover, within given groups of nominal diameter tool sizes it has been found that these dimensions can be maintained substantially the same without any objectionable loss of efficiency of the tool. Nonetheless, it will be understood that the present invention contemplates varying the latter dimensional characteristics for each nominal diameter size of tool in order for each diameter of tool to operate at its maximum efficiency.

I claim:

1. A rotary cutting tool, comprising a generally cylindrical body of solid carbide material having a plurality of helical flutes in its outer periphery, said flutes having a given hand relative to the axis of said body, each flute having a plurality of substantially V-shaped notches therein, said notches each having walls inclined at an angle of from 35° to 45° relative to said axis of said body and a root line extending perpendicular to said axis of said body, the root lines of said notches on one of said flutes each being axially offset relative to the root line of a notch on the preceding flute a distance of from 0.010 to 0.020 inch, the surface between adjacent notches on each of said flutes being from 0.025 to 0.060 inch, and said notches for a nominal tool diameter of from ⅛ to 1 inch having a depth measured from the outer surface of said body of from 0.010 to 0.045 inch.

2. A rotary cutting tool comprising a generally cylindrical body of solid carbide material having a plurality of helical flutes in its outer periphery, each of said flutes having a plurality of substantially V-shaped notches therein, said notches on one of said flutes each being axially offset relative to a notch on the preceding flute a distance of from 0.010 to 0.020 inch, each of said notches having walls inclined at an angle of from 35° to 45° relative to the axis of said body, adjacent walls of adjacent notches of a given flute being spaced apart along the top edge of said given flute a distance of from 0.025 to 0.060 inch, and said notches for a nominal tool diameter of from ⅛ to 1 inch having a depth measured from the outer surface of said body of from 0.010 to 0.045 inch.

3. An end mill, comprising a cylindrical body of solid carbide having a plurality of helical flutes in the outer surface thereof, said helical flutes having a given hand relative to the axis of said body, each flute having a plurality of V-shaped notches therein defined by walls inclined approximately 40° relative to said axis and intersecting to define root lines for said notches, said root lines extending perpendicular to said axis of said body, the root line of each notch on one of said flutes being offset axially in the direction of said hand of said flutes approximately 0.015 inch from the root line of a notch on the preceding flute, adjacent walls of adjacent notches in each of said flutes being spaced apart along the top edge of said flutes a distance of from 0.025 to 0.060 inch, and said notches for a nominal tool diameter of from ⅛ to 1 inch having a depth measured from the outer surface of said body of from between 0.010 and 0.045 inch.

* * * * *